United States Patent Office 3,415,722
Patented Dec. 10, 1968

3,415,722
METHOD OF FORMING CAPACITOR ELECTRODES
Walter Scheller, Munchenstein, Switzerland, George Korinek, Summit, N.J., and Gustav Daendliker, Birsfelden, Switzerland, assignors to Ciba Limited, Basel, Switzerland, a company of Switzerland
No Drawing. Filed Mar. 10, 1966, Ser. No. 533,268
Claims priority, application Switzerland, Mar. 25, 1965, 4,204/65
4 Claims. (Cl. 204—15)

It is known that dry electrolytic capacitors can be manufactured from sintered valve metals (titanium, zirconium, tantalum and niobium).

To manufacture the sintered body an envelope of the metal powder is pressed round a metal wire, and these pressed pellets are then sintered in a high vacuum at a temperature ranging from about 1800 to 2300° C.

The sintered bodies obtained in this manner are then subjected in a first stage to an anodic oxidation, which results in a dielectric oxide layer on the inner and outer surfaces of the porous sintered body. This anodic oxidation is performed by immersing the sintered body in an electrolyte, with the sintered body wired as the positive electrode.

It has now been found that substantial and unexpected advantages can be achieved in forming valve metal pellets by forming the outer surface of the pellet at a higher voltage than its inner surface.

The advantage of the present process resides in the fact that an anode is obtained which has a relatively high scintillation voltage (owing to the thick oxide layer on the outer surface where the field effect is at a maximum) and a relatively high capacity (owing to the relatively thin oxide layer on the inner surface of the anode).

The present process may be performed in a variety of ways. For example, the pellet may be formed at a normal voltage, then impregnated with a substance that is insoluble in the electrolyte, then the impregnant is extracted from the outer surface and the post-forming is continued at a higher voltage. When the forming is complete, the impregnant can be extracted from the inner surface.

Preferably used impregnating agents are those which are soluble in the conventional lipophilic solvents, for example waxes, paraffin wax, anthracene, stearin or the like. The choice of the solvent depends on the type of impregnating agent used.

According to another alternative variant the post-forming is carried out with the use of a highly viscous electrolyte. By virtue of its high viscosity such an electrolyte penetrates the inner surface much more slowly so that predominantly the outer surface is formed.

The identical effect is achieved by using a gelatinous electrolyte for the post-forming of the pellets.

Example 1

The advantages achieved with the new process are shown in the following table:

In the experiments described above the identical tantalum metal was used for the pellets. The scintillation voltage was measured in the usual manner in a solution of manganese nitrate [15% of $Mn(NO_3)_2$ + 10% $HNO_3$ in water].

After the post-forming the impregnating agent was extracted in each case with benzene. The selective dissolution of the impregant was inspected visually by immersing the pellets in benzene and taking them out again from time to time.

Different pellets, which had been formed as described above, were then used for making finished capacitors; these capacitors could be aged at higher voltage than usually and they retained their high capacity.

Example 2

20 sintered tantalum anodes (each weighing 1.85 g.) are formed to 110 volts in 0.01% orthophosphoric acid under a current charge of 30 milliampers per gram at 85° C. and kept for 2 hours under 110 volts. They are then thoroughly rinsed with boiling distilled water and dried.

10 anodes are then post-formed to 160 volts in the identical electrolyte at the same current density and then kept for 2 hours under the final voltage.

5 anodes are impregnated by slow immersion in liquid stearic acid. When the stearic acid has solidified, the anodes are immersed for 90 seconds in vigorously stirred chloroform, then flushed by being sprayed with methanol and dried with absorbent paper. This is followed by anodization under 160 volts, while restricting the current density to 10 milliamperes per anode. The post-forming time required is again 2 hours under 160 volts. The formed sintered bodies are then extracted with chloroform to remove the stearic acid, and the extraction is finalized by immersion in boiling methanol.

All 20 formed sintered bodies are then made up by a known method to capacitors with manganese dioxide as solid electrolyte. As can be seen from the summary of the results achieved, the finished capacitors are distinguished by better values of leakage current and total yield.

|  | Forming final voltage | Capacity [1] µf. | Leakage current per anode, milliampere | Total yield |
|---|---|---|---|---|
| Without stearic acid | 110 | 41.0 | 1.78 | 4/5 |
| Do | 160 | 28.2 | 0.52 | 9/10 |
| With stearic acid | 160 | 38.4 | 0.36 | 5/5 |

[1] Average values.

Example 3

In this example 4 niobium anodes, weighing 1 g., were pre-formed at 25° C. with a current density of 10 milliampere per gram to 40 volts and then post-formed for 2 hours. 0.01% orthophosphoric acid was used as electrolyte.

Two of these anodes are impregnated with stearic acid as described in Example 2 and then superficially bared by partial extraction for 90 seconds in chloroform and subsequent flushing by spraying with methanol.

| Pre-formation | | | Impregnation | | Post-formation | | | Scintillation voltage in volts |
|---|---|---|---|---|---|---|---|---|
| Electrolyte | Temp., °C. | Voltage | Impregnating agent | Solvent | Electrolyte | Temp., °C. | Voltage | Capacity, µ |
| $H_3PO_4$ | 85 | 100 | | | | | | 37.6 | 60 |
| $H_3PO_4$ | 85 | 100 | | | Acetic acid | 30 | 200 | 18.5 | 75 |
| $H_3PO_4$ | 85 | 100 | Synth. wax | Benzene | do | 70 | 200 | 23.7 | 81 |
| $H_3PO_4$ | 85 | 100 | Anthracene | do | $H_3PO_4$ | 30 | 200 | 31.0 | 76 |
| $H_3PO_4$ | 85 | 100 | Stearin | do | $H_3PO_4$ | 30 | 200 | 22.7 | 75 |
| $H_3PO_4$ | 85 | 100 | Paraffin wax | do | Acetic acid | 30 | 400 | 23.0 | 110 |

All 4 anodes are further formed with a constant current density of 80 volts and post-formed for another 2 hours. The stearic acid is extracted as described in Example 2. The formed sintered bodies revealed the following results:

|  | Capacity per pellet, in microfarads | Breakdown voltage in Volts |
| --- | --- | --- |
| Without stearic acid | 24.4 | 80 |
| With stearic acid | 33.7 | 80 |

What is claimed is:

1. A process for forming an electrolytic capacitor electrode from sintered valve metal pellets selected from the group consisting of titanium, zirconium, tantalum and niobium, which comprises subjecting the inner and the outer surface of a porous body of the sintered metal pellets to anodic oxidation in an electrolyte, the oxide layer on the outer surface of the porous body being formed at a higher voltage than that on the inner surface of the porous body.

2. A process according to claim 1, which comprises a first stage pre-forming the pellets by anodization, then impregnating said pellets with a substance that is insoluble in the electrolyte whereby said inner and outer surfaces are coated, extracting the superficial impregnation, whereby said inner surface remains coated, post-forming by anodization the pellets against the higher voltage and removing the impregnation then completely by solvent extraction.

3. A process according to claim 2, which comprises using as impregnating agent an organic substance that is soluble in a lipophilic solvent.

4. A process according to claim 3, which comprises using as impregnating agent a member selected from the group consisting of wax, paraffin wax, anthracene and stearin.

References Cited

UNITED STATES PATENTS

| 2,647,079 | 7/1953 | Burnham | 204—38 |
| 2,668,936 | 2/1954 | Robinson | 204—38 XR |
| 2,930,951 | 3/1960 | Burger et al. | 204—38 XR |
| 2,989,447 | 6/1961 | Power | 204—42 |
| 3,231,800 | 1/1966 | Scherr et al. | 317—230 |
| 3,365,378 | 1/1968 | Maissel et al. | 204—38 |
| 3,366,556 | 1/1968 | Korinek et al. | 204—38 |

JOHN H. MACKS, Primary Examiner.

G. KAPLAN, Assistant Examiner.

U.S. Cl. X.R.

204—38, 56